United States Patent [19]

Haas

[11] Patent Number: 5,044,402
[45] Date of Patent: Sep. 3, 1991

[54] VARIABLE AIR VOLUME TERMINAL UNIT

[75] Inventor: Otto F. Haas, Woodbridge, Canada

[73] Assignee: Nailor Industries Inc., Toronto, Canada

[21] Appl. No.: 574,722

[22] Filed: Aug. 30, 1990

[51] Int. Cl.⁵ .............................................. F16K 1/16
[52] U.S. Cl. ................................. 137/875; 137/625.44
[58] Field of Search ........................... 137/875, 625.44

[56] References Cited

U.S. PATENT DOCUMENTS

| | | | |
|---|---|---|---|
| 2,930,392 | 3/1960 | Smith | 137/875 X |
| 3,166,052 | 1/1965 | Parsons | 137/875 X |
| 3,270,775 | 9/1966 | Alderson | 137/625.44 |
| 4,156,439 | 5/1979 | Jeffries et al. | 137/875 X |
| 4,388,950 | 6/1983 | Stauffer et al. | 137/875 X |

Primary Examiner—John C. Fox
Attorney, Agent, or Firm—Rogers, Bereskin & Parr

[57] ABSTRACT

A variable volume terminal unit for an air handling system includes a duct having an air by-pass outlet in its top wall, and a deflector blade that can be moved between a "straight through" position in which the by-pass outlet is closed, and a position in which at least some of the air flowing through the duct is deflected through the by-pass outlet. The deflector blade is of an angled shape selected so that, in the deflecting position, the blade presents a substantially symmetrical surface to the incoming air, while in the straight-through position, the blade closes the by-pass outlet.

7 Claims, 2 Drawing Sheets

VARIABLE AIR VOLUME TERMINAL UNIT

FIELD OF THE INVENTION

This invention relates generally to air handling systems for buildings and is concerned more particularly with so-called variable air volume terminal units for controlling delivery of conditioned air to a space within a building.

BACKGROUND OF THE INVENTION

Terminal units of the type referred to typically comprise a duct through which conditioned air flows from a supply to the space to be conditioned, and a diverter blade within the duct that can be positioned to vary the volume of air entering the space by diverting some of the air to a by-pass outlet in the duct. The air that is diverted by-passes the space and may, for example, flow into a return air plenum of the overall air handling system. Units of this type are often referred to as "by-pass boxes".

The duct is usually of rectangular shape in cross-section and has an inlet at one end and an outlet at the other end so that the conditioned air normally flows straight through the duct. The by-pass outlet is provided by an opening in the wall of the duct, for example at the top, and the blade is positioned within the duct so that it can deflect all or some of the conditioned air to the by-pass outlet.

In its simplest form, the blade takes the form of a plain rectangular plate that is pivoted to the wall of the duct adjacent the by-pass outlet opening, for movement between a position in which it closes the opening so that all of the air flows straight through the duct, and a position in which the blade is angled with respect to the incoming air so that the air is diverted by the blade into the by-pass opening. Typically, the blade is mounted on a shaft that is pivoted to the wall of the duct and an actuator is mounted externally on the duct and coupled to the shaft for turning the shaft between its two extreme positions under the control of a thermostat in the space to be conditioned.

A disadvantage of this diverter blade arrangement is that air impinging against the blade when the blade is in an angled position across the duct imposes relatively high torque forces on the shaft that must be overcome by the actuator when the blade is to be moved. Relatively powerful actuators must therefore be used and the service life of the actuator is often detrimentally affected.

In an attempt to address these problems, it has been proposed to mount the blade on a pivot shaft that is located at the center of the blade and extends transversely of the duct at the mid-point of its height. In this configuration, part of the blade is above the pivot shaft and part below so that the turning effect on the shaft imposed by the air impinging on one part of the blade is counter-acted and ideally balanced by the air that impinges on the other part of the blade.

While this blade arrangement avoids the imposition of high torque loads on the blade pivot shaft, an auxiliary blade must be provided to close the by-pass outlet in the duct when all of the air is to flow straight through. Normally, the auxiliary blade is pivoted to the duct at the side of the by-pass opening but out of the main air flow through the duct, and the auxiliary blade is coupled to the main diverter blade by a linkage so that the auxiliary blade is opened and closed automatically in response to turning of the main diverter blade under the control of the actuator.

This arrangement not only introduces additional components and, therefore, cost and attendant service difficulties, but the actuator for the main diverter blade must now be powerful enough to move both blades.

BRIEF DESCRIPTION OF THE INVENTION

An object of the present invention is to provide a variable air volume terminal unit that addresses these problems of the prior art.

The unit provided by the invention includes a duct having an inlet for conditioned air, a main outlet, and a by-pass outlet, and the duct defines an air flow path between the inlet and the main outlet, with the by-pass outlet being located in a wall of the duct laterally of the air flow path. An air deflector blade is pivotally mounted within the duct, for angular movement about a pivot axis between a diverting position in which incoming air is deflected to the by-pass outlet, and a straight-through position in which the blade closes the by-pass outlet. The pivot axis extends transversely of the duct at a position spaced inwardly of the duct from the by-pass outlet and the blade has an angled shape selected so that, in said diverting position, the blade presents to the incoming air, surface portions of substantially similar area disposed on respectively opposite sides of the shaft and, in said straight-through position, a portion of the blade closes the by-pass outlet. An actuator is coupled to the blade for moving it between said positions.

It will be appreciated that the terminal unit provided by the invention has the advantage that the air deflector blade presents a "balanced" surface configuration to the incoming air when the by-pass outlet is open, thereby avoiding the uni-directional torque forces that are imposed on the shaft in the single blade configuration of the prior art. This allows the use of an actuator which is less powerful (and therefore less expensive) than the actuator that would be required for a comparable prior art unit. Also, service life is extended. At the same time, with the invention, only a single blade damper is required to perform the dual functions of deflecting the air to the by-pass outlet when the unit is in the by-pass mode, and to close the by-pass outlet when the unit is in the "straight through" mode.

Preferably, the blade includes first and second end portions that extend in generally opposite directions from the shaft for confronting the incoming air in the diverting position of the blade, and the first blade end portion is coupled at its inner end to the shaft while the second blade end portion is spaced from the shaft by an intermediate blade portion.

While it might be possible to design the unit to have a circular section air duct, the duct will normally be of rectangular shape in cross-section with the by-pass outlet in one wall (say the top wall) of the duct and the pivot axis located transversely of the duct parallel to that wall and at a position spaced mid-way between that wall and the opposite wall. The blade end and intermediate portions will then be of rectangular shapes selected so that the blade substantially completely closes the duct when the blade is in its diverting position.

BRIEF DESCRIPTION OF DRAWINGS

In order that the invention may be more clearly understood, reference will now be made to the accompanying drawings which illustrate a particular preferred

DESCRIPTION OF PREFERRED EMBODIMENT

Figure 1:
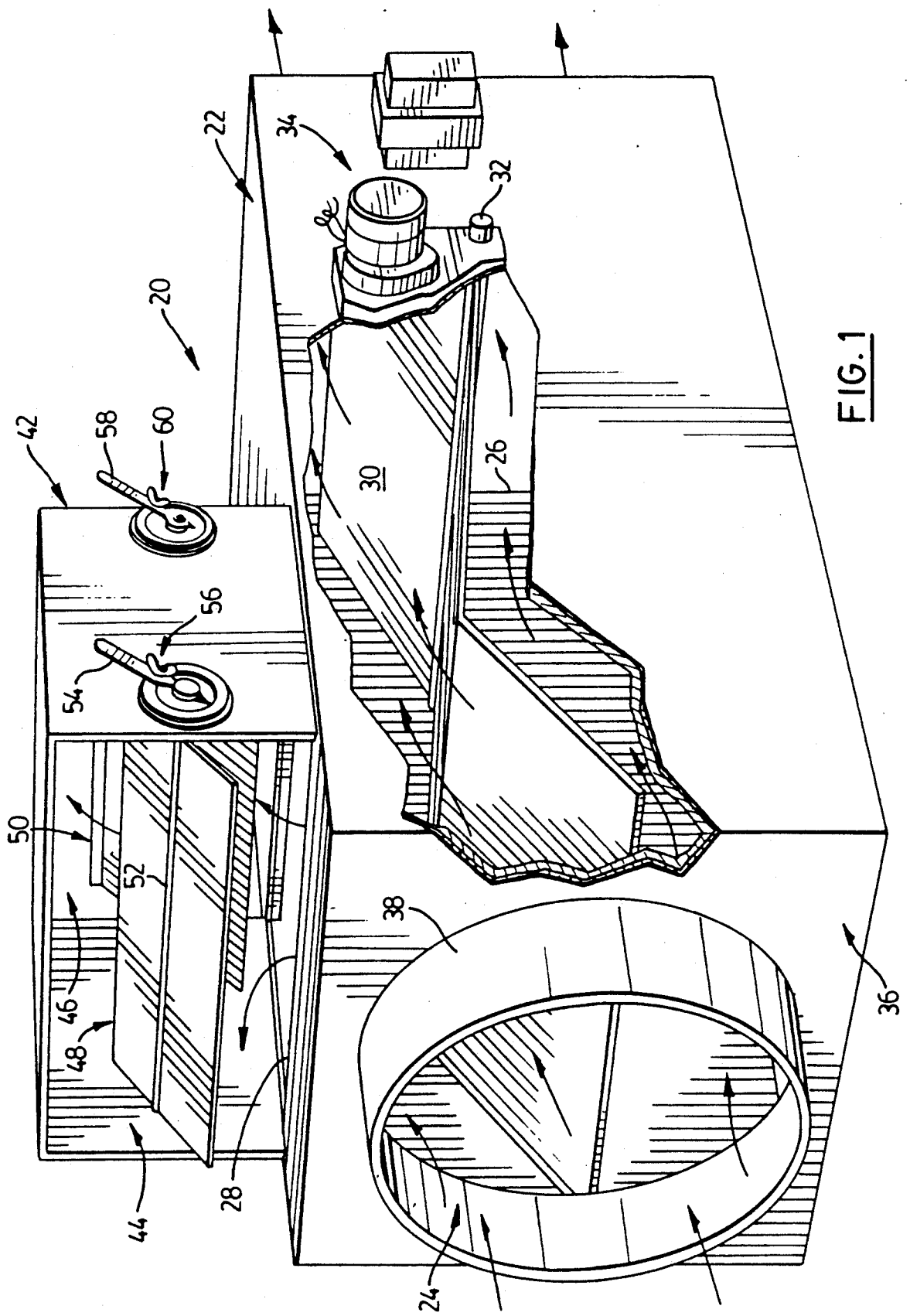
FIG. 1 is a perspective view from one end of a variable volume terminal unit for an air handling system in accordance with a preferred embodiment of the invention, part of the unit being broken away to show internal structure; and, FIG. 2 is a vertical sectional view generally on the longitudinal centreline of the unit shown in FIG. 1.

Referring to the drawings, the variable air volume terminal unit provided by the invention is generally denoted by reference numeral 20 and includes a duct 22 having an air inlet 24, a main air outlet 26 and a by-pass air outlet 28. An air deflector blade within the duct is generally indicated by reference numeral 30. The blade is mounted on a pivot shaft 32 that extends through the side walls of the duct. An actuator 34 is mounted externally on one of those walls and is coupled to shaft 32, for turning the shaft and thereby adjusting the angular position of the blade 30 within the duct.

Figure 2:
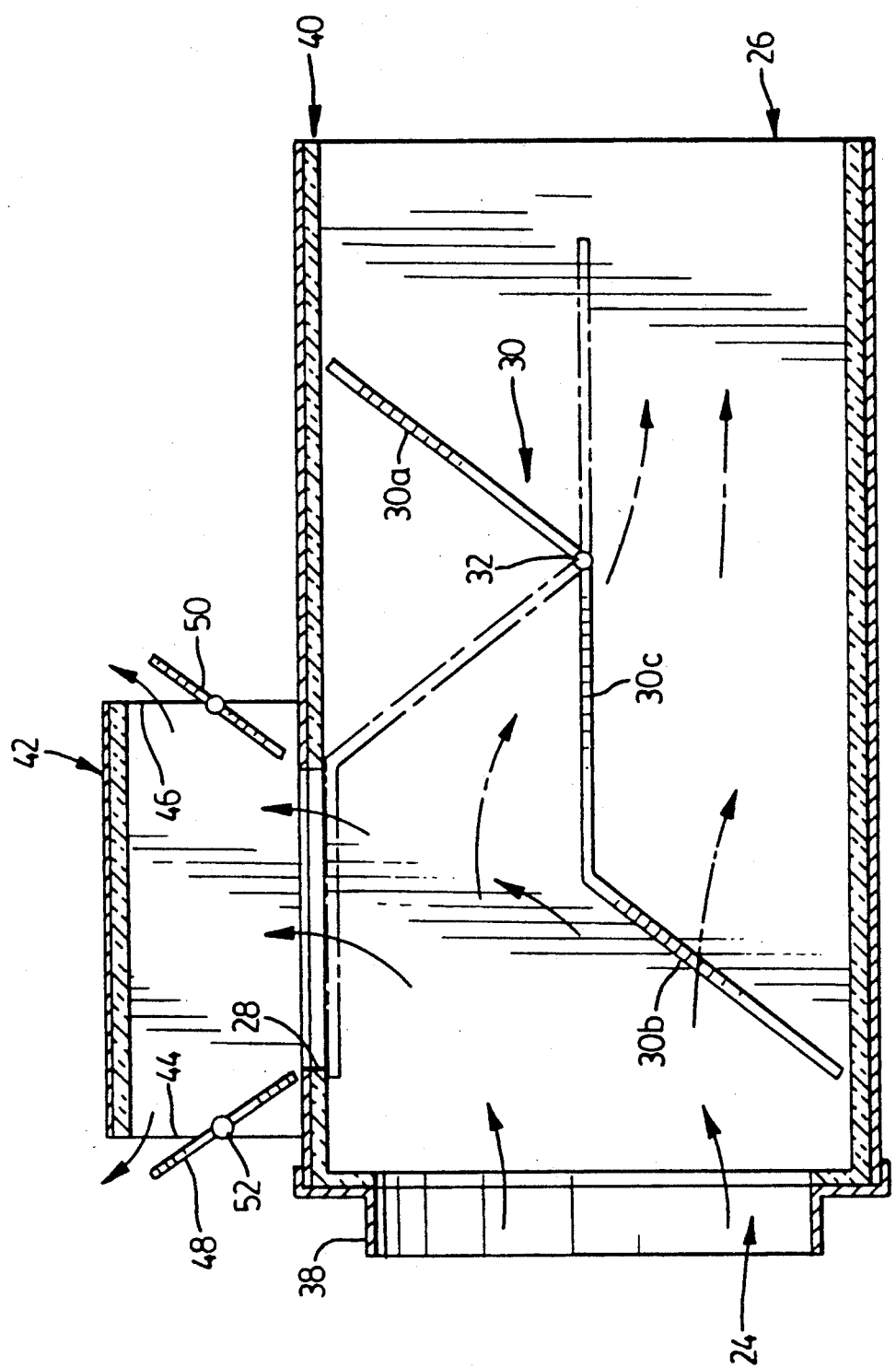

FIG. 2 shows two extreme adjusted positions of the blade. In the position shown in full line, air entering the duct through inlet 24 is deflected upwardly and through the by-pass outlet 28. In the ghost outline position, on the other hand, by-pass outlet 28 is closed and the air flows straight through the duct. In practice, unit 20 will be connected in an air handling system for delivering conditioned air from a supply, through inlet 24, to an occupied space in the building, via outlet 26. A thermostat in the space will be used to control actuator 34 to adjust the position of blade 30 in accordance with the heating or cooling requirements for the space. For example, in a cooling application, cold air will be delivered from an air conditioning unit to the space to be cooled, via terminal unit 20. If the temperature in the space increases so that the thermostat (not shown) calls for additional cooling, actuator 34 will move blade 30 towards the ghost outline position of FIG. 2 (by-pass closed) so that additional cold air will be delivered to the space. When the thermostat is satisfied, actuator 34 holds the blade in the adjusted position it occupies at that time and the same volume of air is delivered to the room until there is further demand from the thermostat. If the room temperature decreases too far, the thermostat causes the actuator to move the blade in the opposite direction, decreasing the volume of cold air that is delivered to the space and causing a greater proportion of the incoming cold air to be diverted to by-pass outlet 28.

Actuator 34 is a conventional electric actuator comprising an electric motor and gear train coupling the shaft and motor so that the shaft is turned at a relatively slow speed with respect to the motor speed. A conventional pneumatic actuator could be used as an alternative.

Referring now to the drawings in more detail, duct 22 is a rectangular section fabrication of galvanized steel fitted at one end with an end plate 36 that has a circular inlet 38 for connection to an inlet duct of the air handling system (not shown). In the drawings, the opposite end of the duct is shown as open since it may be fitted with a variety of attachments depending on the particular application to which the unit is to be put. For example, the outlet end of the duct can be fitted with a reheat unit, a multiple outlet plenum or a single cylindrical outlet similar to inlet 38. In this embodiment, the interior of the duct is coated with acoustic glass fiber insulation, as indicated generally at 40 in FIG. 2.

By-pass outlet 28 takes the form of a plain rectangular opening in the top wall of duct 22. A cover or housing for the by-pass opening is indicated by reference numeral 42 and takes the form of a fabrication in galvanized steel. As can best be seen in FIG. 1, cover 42 is of inverted U-shape so as to define by-pass air openings 44 and 46 at opposite ends of the cover, which are fitted with adjustable dampers 48 and 50 respectively. Each damper is essentially a flat rectangular blade which is mounted on a pivot shaft that extends transversely across the center of the relevant by-pass opening (44 or 46). The pivot shaft for blade 48 is indicated at 52. The shaft is pivoted to the end walls of cover 42 and an end portion of the shaft projects from the cover and is fitted with a radial lever 54 that can be used to adjust the inclination of the blade. A clamp 56 can be used to lock the lever (and hence the blade) in an adjusted angular position with respect to cover 42. A similar lever and clamp for blade 50 are indicated at 58 and 60 respectively.

In practice, the two damper blades 48 and 50 will be adjusted and set in their adjusted positions as part of the "balancing" operation that is normally performed when an air handling system is installed. Once set, the dampers will not normally require adjustment except possibly during maintenance of the overall system.

The pivot shaft 32 for the main diverter blade 30 extends transversely of the duct 22 at a position spaced inwardly of the duct from the by-pass outlet 28. More specifically, shaft 32 is positioned parallel to the front and rear edges of opening 28 substantially at the center of the height of the duct. Blade 30 is mounted directly on the blade and has an angled shape selected so that, in the full line position of the blade (by-pass position) the blade presents to the incoming air surface, portions of substantially similar area that are disposed on respectively opposite sides of the shaft (above and below), so that no net turning effect is imposed on the shaft 32 due to air impingement against the blade.

At the same time, the angled shape of the blade is selected so that, when the blade which reaches the ghost outline position (straight through) the blade itself closes the by-pass outlet and no auxiliary blade and associated linkages are required.

More specifically, blade 30 has first and second end portions 30a and 30b respectively that extend in respectively opposite directions from shaft 32 and parallel to one another. The first end portion 30a is coupled at its inner end to shaft 32 while the second end blade portion 30b is spaced from the shaft by an intermediate blade portion 30c. As can be seen from FIG. 1, all three blade portions are of rectangular shape and all extend over the full width of the interior of the duct so that the duct is substantially completely closed when the blade is in its full line position. The length of the intermediate blade portion 30c is selected so that the second blade end portion 30b will coincide with and close the by-pass opening 28 when the blade is in its ghost outlined position of FIG. 2.

A further advantage of the particular blade configuration provided by the invention is that, in the "straight-through" position, the effective cross-sectional area of the duct that is available to the air flowing through the duct is reduced to the area below shaft 32. This narrowing of the duct causes the air to accelerate within the duct and then decelerate as it leaves the duct, which makes for quieter operation of the unit.

It should of course be noted that the preceding description relates to a particular preferred embodiment of the invention only and that many modifications are possible within the broad scope of the invention, some of which have been indicated while others will occur to a person skilled in the art. Possible modifications include variations in the specific angled shape of the blade, and in the configuration of the duct, and pivoted mounting of the blade on stub axles or other projections from the blade, instead of on a shaft as such.

It should also be noted that, while reference has been made to the use of a unit of the form provided by the invention in an air conditioning system, the same unit can also be used in a heating system. Accordingly, references to "conditioned" air are intended to include both heating and cooling. Also, the reference to the unit of the invention as a "terminal" unit is simply a reflection of terminology used in the art. The unit can in fact be used at any point in an air handling system in which variation of volume is required.

I claim:

1. A variable volume terminal unit for an air handling system, comprising:
   a duct having an inlet for conditioned air, a main outlet, and a by-pass outlet, the duct defining an air flow path between said inlet and main outlet and the by-pass outlet being located in a wall of the duct laterally of said air flow path;
   an air deflector blade mounted within said duct for angular movement about a pivot axis between a diverting position in which incoming air is deflected to said by-pass outlet, and a straight-through position in which the blade closes the by-pass outlet, said pivot axis extending transversely of the duct at a position spaced inwardly of the duct from said by-pass outlet, and the blade having an angled shape selected so that, in said diverting position of the blade, the blade presents to the incoming air, surface portions of substantially similar area disposed on respectively opposite sides of the shaft and, in the straight-through position of the blade, the by-pass outlet is closed by a portion of the blade; and,
   an actuator coupled to said blade for moving the blade between said positions.

2. A unit as claimed in claim 1, wherein said pivot axis is defined by a pivot shaft, and wherein said blade includes first and second end portions that extend generally in opposite directions from the shaft parallel to one another and provide said surface portions of substantially similar area, said first blade end portion being coupled at its inner end to said shaft and the blade further including an intermediate blade portion spacing the second blade end portion from the shaft, the first and second blade portions being angled with respect to the intermediate blade portion so that said second blade end portion closes the by-pass outlet in said straight-through position of the blade.

3. A unit as claimed in claim 2, wherein said duct is of rectangular shape in cross-section and said blade extends transversely of the duct parallel to said wall in which the by-pass outlet is located and at a position substantially mid-way between said wall and an opposite wall of the duct.

4. A unit as claimed in claim 3, wherein said first and second blade end portions are each of a size and shape selected to substantially close the respective portions of the cross-sectional area of the duct between said shaft and each of said duct wall in which the by-pass outlet is located, and the opposite said wall, when the blade is in its said diverting position.

5. A unit as claimed in claim 4, wherein said blade portions are angled with respect to one another so that, in said diverting position of the blade, each of said first and second end portions is inclined in the direction of air flow along said path, while said intermediate blade portion is substantially parallel to said wall of the duct in which the by-pass outlet is located.

6. A unit as claimed in claim 1, further comprising a cover defining an enclosure outwardly of said by-pass outlet, said enclosure having openings at respectively opposite ends, and adjustable damper means for controlling air flow through said openings.

7. A variable volume terminal unit for an air handling system, comprising:
   a duct having an inlet for conditioned air, a main outlet, and a by-pass outlet, the duct defining an air flow path between said inlet and main outlet and the by-pass outlet being located in a wall of the duct laterally of said air flow path;
   an air deflector blade mounted on a pivot shaft within said duct, for movement between a diverting position in which incoming air is deflected to said by-pass outlet, and a straight-through position in which the blade closes the by-pass outlet, said pivot shaft extending transversely of the duct at a position spaced inwardly of the duct from said by-pass outlet, and the blade including first and second end portions that extend in generally opposite directions from said shaft and confront the incoming air in said diverting position of the blade, said first blade end portion being coupled at its inner end to said shaft and the blade further including an intermediate blade portion spacing the second blade end portion from the shaft, said first and second blade portions being angled with respect to the intermediate blade portion so that said second end portion closes the by-pass outlet in said straight-through position of the blade; and,
   an actuator coupled to said shaft for moving the blade between its said positions.

* * * * *